United States Patent

Mimms

[11] 4,021,662
[45] May 3, 1977

[54] LASER TARGET SIMULATOR
[75] Inventor: Vernon Mimms, Orlando, Fla.
[73] Assignee: The United States of America as represented by the Secretary of the Air Force, Washington, D.C.
[22] Filed: July 9, 1975
[21] Appl. No.: 594,421
[52] U.S. Cl. .................. 250/203 R; 244/3.16; 356/148; 356/152
[51] Int. Cl.[2] ........................................ G01J 1/20
[58] Field of Search .......... 250/203; 356/148, 152; 244/3.16

[56] References Cited
UNITED STATES PATENTS
3,907,433  9/1975  Nault .............................. 356/152

FOREIGN PATENTS OR APPLICATIONS
1,914,250  10/1970  Germany ........................ 244/3.16

Primary Examiner—Alfred E. Smith
Assistant Examiner—David K. Moore
Attorney, Agent, or Firm—Joseph E. Rusz; Willard R. Matthews, Jr.

[57] ABSTRACT

The laser target simulator of the invention comprises two point sources of light energy (LEDs) aimed at a section of concave spherical mirror which collimates the light energy and projects it across the full aperture of a laser seeker. One of the point sources of light energy is positioned on the laser seeker boresight at the mirror focal point. The other is positioned in spaced adjacent relationship to it and is rotatable about the laser seeker boresight. A CW light source is positioned coaxially to the boresight point source of light. The simulator also includes light source control circuits that make it possible to test the various operational modes of the laser seeker including tracking rates and accuracies, acquisition logic, laser pulse coding, and false target rejection.

7 Claims, 2 Drawing Figures

LASER TARGET SIMULATOR

STATEMENT OF GOVERNMENT INTEREST

The invention described herein may be manufactured and used by or for the Government for governmental purposes without the payment of any royalty thereon.

BACKGROUND OF THE INVENTION

This invention relates to target simulation means for evaluating point target tracking systems, and more particularly to laser target simulators adapted to use in combination with missile borne laser seekers.

It is necessary, in evaluating systems of this type, to generate a point source laser target which covers the entire optical aperture of the laser seeker and to put this simulating means into a small package which can be placed over the nose of the laser seeker bearing missile. It is desirable that such a system achieve these things and that it does so in such a way that the various operational modes of the missile can be tested. Lost pulse logic, missing pulse, good guidance tracking rates and accuracies, acquisition logic, laser pulse coding, false target rejection, optical noise rejection, and operation at various power levels all must be tested with the laser target simulator. The state-of-the-art approach to this problem is to use either a strobe or a laser diode placed at sufficient distance from the laser seeker to approximate a point source. Such a technique requires much space, the use of cumbersome and complex equipment and the application of exacting alignment procedures. Furthermore, it is not possible to perform all of the abovementioned tests and evaluations using conventional techniques. There currently exists, therefore, the need for a target simulator that is compact, lightweight, and that more accurately simulates a laser target. It is important that it be possible to completely check out a laser seeker with it and that it be capable of generating qualitative as well as quantitative data. In addition, such a device should allow the sensitivity of the 1.06μ detector used in most laser seekers to be verified in two modes to insure that this critical item has not deteriorated. The present invention is directed toward satisfying those needs.

SUMMARY OF THE INVENTION

The invention comprehends target simulation by means of a convex spherical mirror segment that reflects light from various point sources of light onto the light receiving aperture of a laser seeker. The point sources of light (1.06μ LEDs in one preferred embodiment) are positioned at the mirror focal point with one being on the laser system boresight and another displaced from and rotatable about the first. A CW source of light is also provided. The target simulator is operated by controls that provide coded operation and power level manipulation of the point sources of light.

It is a principal object of the invention to provide a new and improved laser target simulator.

It is another object of the invention to provide a laser target simulator that is compact, lightweight and accurately simulates a laser target.

It is another object of the invention to provide a laser target simulator that is capable of testing a laser seeker system for lost pulse logic, missing pulses, guidance, tracking rates and accuracies, laser pulse coding, acquisition logic, false target rejection, optical noise rejection, and operation at various power levels.

It is another object of the invention to provide a laser target simulator that is capable of generating qualitative as well as quantitative test data.

These, together with other objects, features and advantages of the invention, will become more readily apparent from the following detailed description when taken in conjunction with the illustrative embodiment in the accompanying drawings.

DETAILED DESCRIPTION OF THE PREFERRED EMBODIMENT

Figure 1:
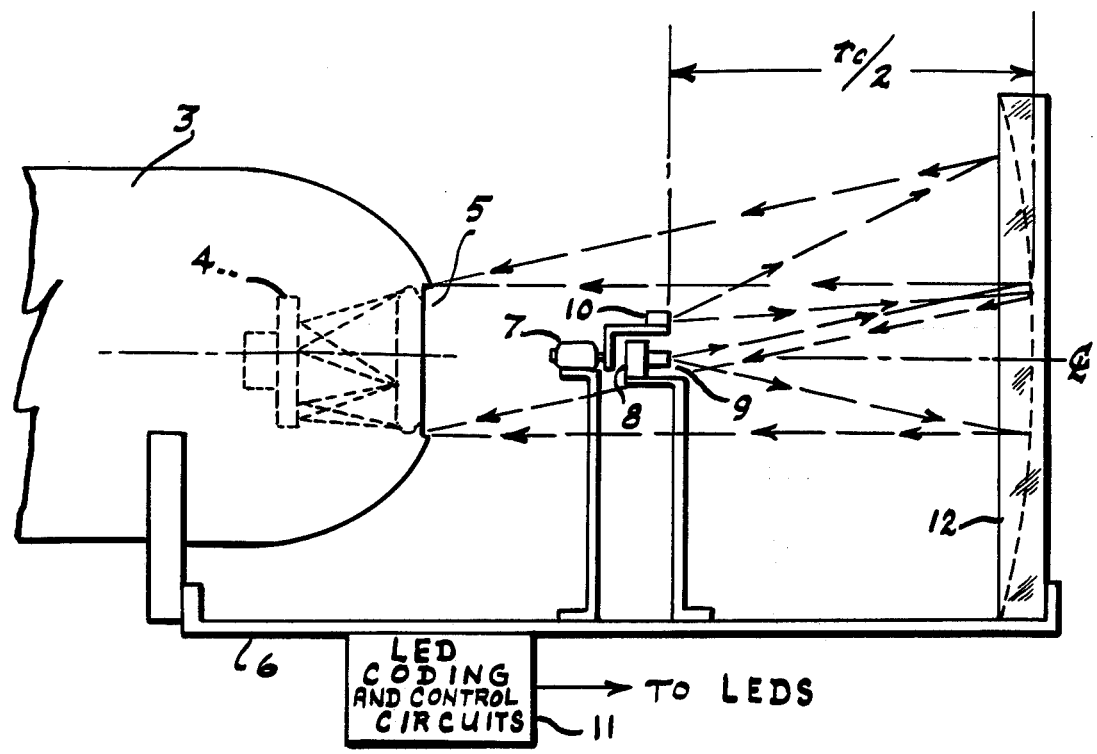
FIG. 1 is a side view of one presently preferred embodiment of the invention.
Figure 2:
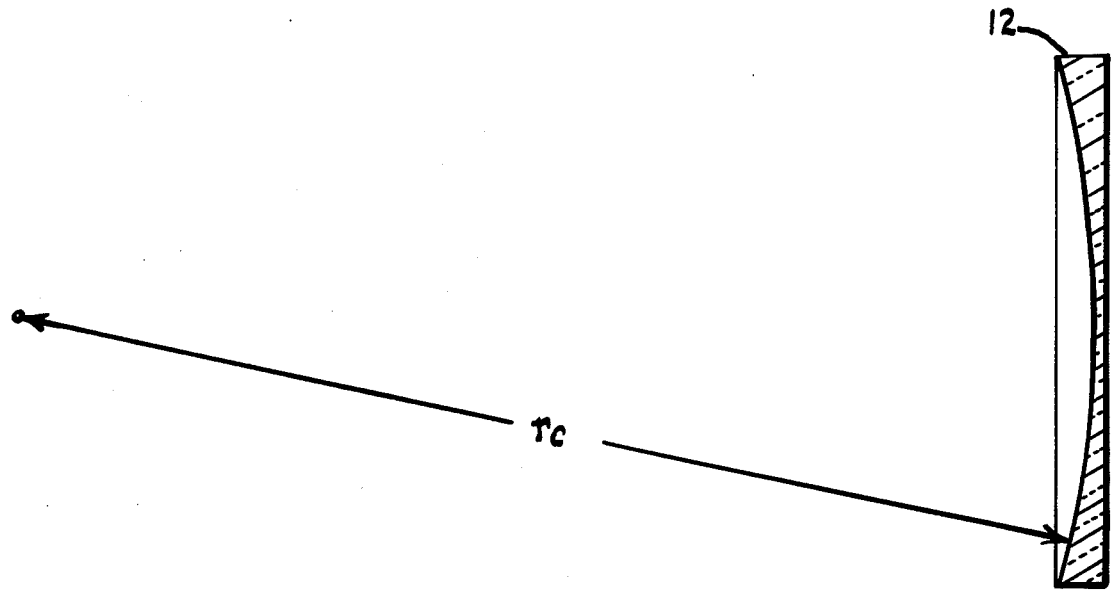
FIG. 2 is a sectional view of the convex spherical mirror of FIG. 1.

Referring now to FIGS. 1 and 2, a concave spherical mirror segment 12 is centered on the boresight or center-line of laser seeker 4 and is positioned and oriented to reflect light energy onto laser seeker light receiving aperture 5. Mirror segment 12 has a radius of curvature $r_c$. It is illustrated in section by FIG. 2. A first point source of light energy 9 is positioned on the laser seeker center-line at a distance $r_c/2$ from mirror segment 12 and is oriented to project light energy thereat.

A second point source of light energy 10 is positioned adjacent to point source 9 also at a distance $r_c/2$ from the mirror and is mechanized to rotate about the system center-line by means of motor 7. Any suitable mounting structure such as frame 6 can be used to retain the components of the simulator in place and secure it to missile 3. A CW light source 8 is mounted coaxially to point source 9 and is directed toward the mirror. Coding and control circuits 11 control point sources 9 and 10 in testing the various operational modes of the laser seeker.

By way of specific example, a target simulator of the type described can consist of a 10-inch circular section of an 18-inch radius spherical mirror which collimates and reflects light from a Gallium-Indium-Arsenide 1.06μ light emitting diode (LED) 9 which is placed 9 inches from the mirror (at the focal point). Because the focal point of the mirror is a 9 inches radius sphere, LEDs can be placed at more than one location or may be rotated around a circle, the plane of which is perpendicular to the center line of the system, by use of a motorized mechanism. The LEDs 9, 10 should be aimed in the direction of the radius of the mirror 12, and the laser seeker 4 should be close enough behind the diodes so that the full aperture 5 is illuminated. By using two LEDs, one boresighted and one located at another point within the instantaneous field of view of seeker 4, it is possible to test the seeker for last pulse logic by triggering one LED 100 n/sec after the first. The seeker gimbal angles can be used to indicate which LED is being tracked. Missing pulse logic may be tested by causing the LEDs to drop pulses and to observe whether tracking is properly maintained.

Tracking rates and accuracies may be measured by operating first one LED, then the other, and measuring the time required to null the seeker and the gimbal angle at null. By rotating the off-axis LED 10 at a known rate with the motorized system, the tracking lag and rates can be measured. Acquisition logic, laser pulse coding, and false target rejection can all be tested by properly coding the LED. The simulator can use a CW light source 8 to generate optical noise. This noise can be calibrated by measuring the level of the noise AGC signal and can be used to insure that the detector on the seeker has not become noisy because of aging or other factors.

By controlling the power output of the 1.06μ source, the seeker's operation at various power levels (watts/cm²) can be tested. By using a calibrated source the sensitivity of the seeker can be measured.

While the invention has been described in one presently preferred embodiment, it is understood that the words which have been used are words of description rather than words of limitation and that changes within the purview of the appended claims may be made without departing from the scope and spirit of the invention in its broader aspects.

What is claimed is:

1. In combination with a laser seeker system having a light receiving aperture a laser target simulator comprising
    a segment of concave spherical mirror having a radius of curvature $r_c$ positioned to reflect light energy along the laser seeker system boresight toward said light receiving aperture,
    a first point source of light energy positioned on said laser seeker system boresight a distance $r_{c/2}$ from said mirror and oriented to project light energy toward said mirror in the direction of the mirror radius intercepted thereby, and
    a second point source of light energy positioned in spaced adjacent relationship to said first source of light energy a distance $r_{c/2}$ from said mirror and oriented to project light energy toward said mirror in the direction of the mirror radius intercepted thereby.

2. A laser target simulator as defined in claim 1 including means for rotating said second source of light energy around said first source of light energy.

3. A laser target simulator as defined in claim 2 including a CW light source disposed in coaxial relationship with said first point source of light energy positioned at a distance substantially $r_{c/2}$ from said mirror and oriented to project light energy toward said mirror.

4. A laser target simulator as defined in claim 3 wherein said first and second point sources of light energy are Gallium-Indium-Arsenide light emitting diodes.

5. A laser target simulator as defined in claim 4 including means for providing coded operation of said first and second point sources of light energy.

6. A laser target simulator as defined in claim 5 including means for controlling the power levels of said first and second point sources of light energy.

7. A laser target simulator as defined in claim 6 wherein said mirror is positioned a distance from said laser seeker that provides total illumination of said light receiving aperture by light energy reflected thereby.

* * * * *